March 23, 1954
R. W. VERDON
2,673,335
CONVENIENCE OUTLET
Filed March 22, 1950
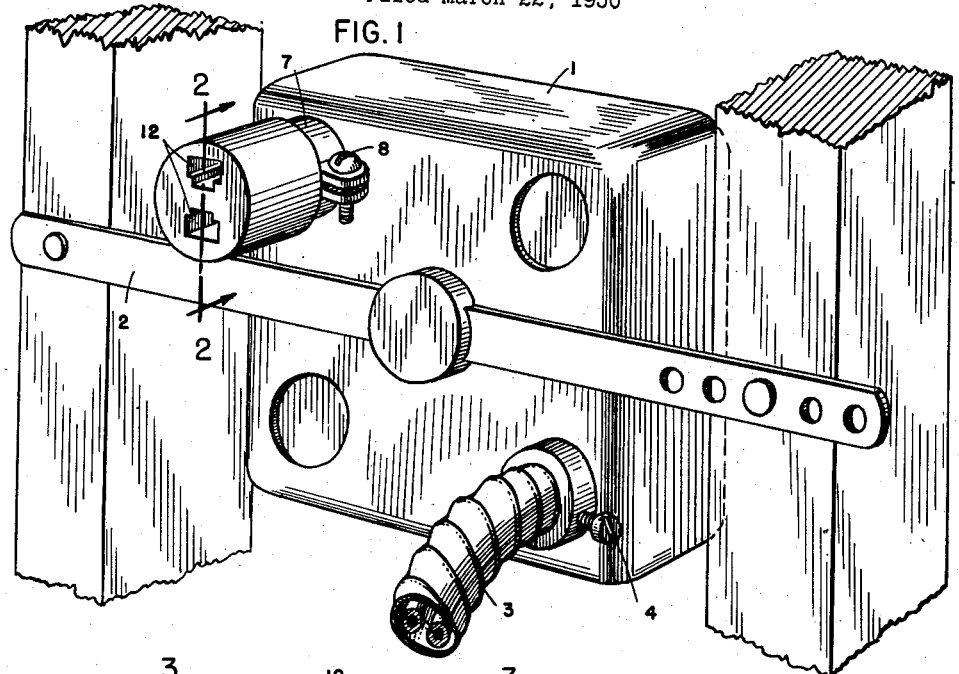
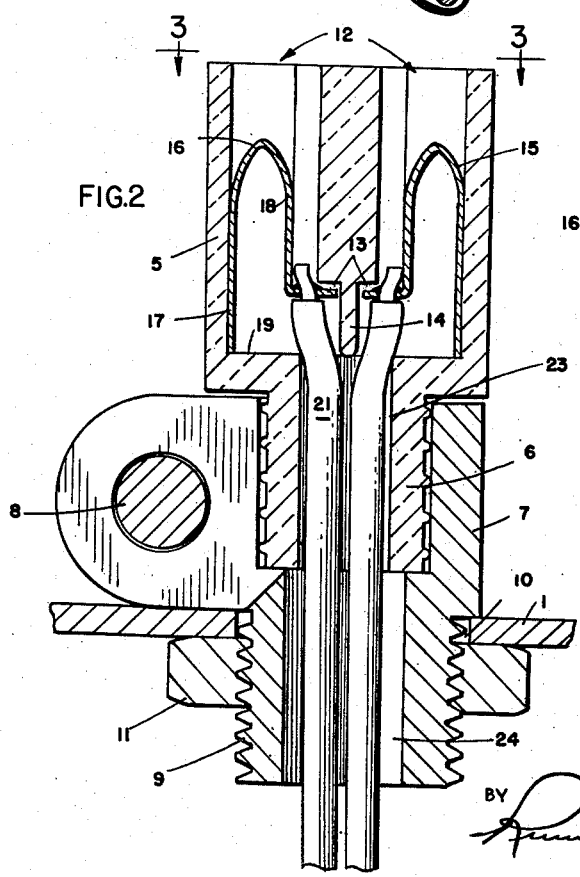
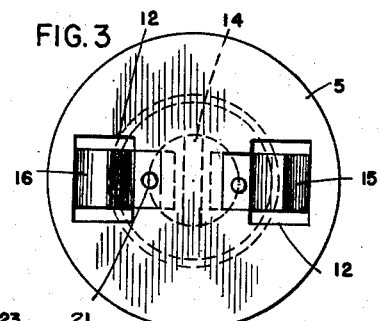
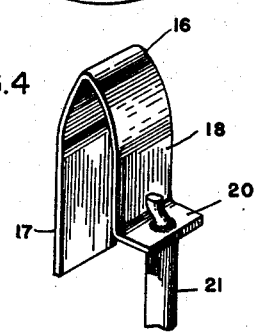
*INVENTOR:*
RICHARD W. VERDON
BY
ATT'YS Patented Mar. 23, 1954

2,673,335

UNITED STATES PATENT OFFICE 2,673,335

CONVENIENCE OUTLET

Richard W. Verdon, Hinsdale, Ill.

Application March 22, 1950, Serial No. 151,116

2 Claims. (Cl. 339—191)

This invention relates to improvements in convenience outlets.

The main objects of this invention are to provide a new and improved convenience outlet which is adapted to be fixedly attached to the rear wall face of an electrical conduit box; to provide a relatively simple and inexpensive convenience outlet of improved design to be rigidly secured to the rear face of an electrical conduit box which is already anchored in a common wall between two rooms and serves as an outlet source of current for one of the rooms and whereby my improved outlet serves as an outlet source for the room on the opposite side; and to provide a new and improved form of convenience outlet which may be quickly secured to the rear face of an already installed electrical outlet box.

An illustrative embodiment of this invention is shown in the accompanying drawings wherein:

Figure 1 is a perspective view of the device of the present invention shown attached to the rear face of an electric outlet box.

Fig. 2 is a cross sectional view taken on the line 2—2 of Fig. 1.

Fig. 3 is an elevational view taken on the line 3—3 of Fig. 2.

Fig. 4 is a perspective view of one of the contacts of the device of my invention, shown detached from the housing.

Referring in detail to the drawings, and especially Figure 1, the electrical outlet box 1 is of the usual type, that is, one adapted to be positioned between the rafters of a building wall and retained there by the strap hanger bracket 2. The open or face side of the box is normally substantially flush with the plastered wall of a room and the usual convenience outlet is secured therein for providing ready access to electric current. Electric current is supplied to the box through a conduit 3 which conduit is anchored to the box by means of the usual BX clamp 4.

The convenience outlet of my invention is preferably constructed of porcelain, Bakelite or the like, and comprises a housing 5 having a cylindrical base 6 which is adapted to seat within the usual BX clamp 7. The clamp 7 locks the base 6 therein by means of the usual set screw 8.

The BX clamp 7 contains an externally threaded shank 9 which projects through the opening 10 in the rear wall of the box 1 and the clamp is rigidly positioned to the rear wall by a lock nut 11.

The housing 5 is provided with a pair of parallelly disposed elongated T-shaped slots 12 the head of the T-shaped slots being of a size sufficient to accommodate the prongs of the usual electric plug. Each of the slots 12 is provided with an undercut portion 13. A narrow, wide divider strip 14, which is an integral part of the housing 5 is positioned medially of the housing.

The contact elements 15—16 are preferably constructed of brass and are bent in the form of an inverted U. In each element the leg 17 is longer than the leg 18 so that when the element is positioned in one of the slots 12, the leg 17 will abut against the bottom wall 19. The lower end of the leg 18 of the contact element is bent outwardly at right angles to the face of the leg 18 to form a flange 20 which contains a medially positioned aperture through which the bare end of the wire 21 is threaded and the same is soldered to the flange 20.

It can readily be seen that by pressing the legs 17—18 together, the flange 20 will move outwardly away from the undercut 13 whereby the contact may be withdrawn from the housing and that by merely pressing the legs 17—18 towards each other, the contact may be readily inserted in the T-slot 12 and by pressing it downwardly into the slot until the leg 17 abuts against the lower wall 19, the flange 20 will spring into the position shown in Fig. 2 and be prevented from accidental withdrawal because the flange 20 will abut against the undercut 13.

In actual practice, the contacts are normally removed from the housing and the wire 21 is secured to the flange 20. In placing it in position, the opposite end of the wire is passed downwardly through the T-slot where they will pass through the channel 23 in the base 6 and the alined channel 24 in the shank 9 of the conduit clamp 7.

When the free end of the wire 21 has passed beyond the end of the shank 9 of the conduit clamp 7, it will be within the interior of the electrical outlet box 1.

There are many other places where the convenience outlet of my invention may be put, for instance, as a floor outlet in attics when secured to outlet boxes for ceiling lights in the room below.

Although but one specific embodiment of this invention is herein shown and described, it will be understood that numerous details of the construction shown may be altered or omitted without departing from the spirit of the invention as defined by the following claims.

I claim:

1. An electrical convenience outlet, adapted to be secured to the rear face of a junction box by a cable-coupler, a one-piece unitary elongated housing having a reduced portion at one end thereof adapted to fit the cable opening of said coupler and be clamped therein, said housing having an axial bore extending through said reduced portion thereof, a pair of parallelly disposed spaced L-shaped slots, in vertical section, in said housing extending in the same direction as said bore on diametrically opposite sides of the axis thereof, each of said slots communicating with said bore endwise, a pair of resilient inverted substantially U-shaped contact elements, one in each of said slots, one leg of each of said elements being longer than the other leg and said shorter leg having a right-angle flange at its distal end extending toward the axis of said bore, a pair of undercut portions in said housing providing shoulders against which said flanges respectively abut in the axial direction of the slots to prevent accidental displacement of said elements when the free end of the longer legs are substantially abutting the inner end of their respective slots, said slots being of a size sufficiently large enough to permit insertion of said respective contact elements from the surface on the end of said housing opposite said junction box while the element legs are partially collapsed together.

2. The device according to claim 1 wherein the free end of the connecting wires for said convenience outlet are adapted to be passed through said bore and one each through said respective slots and soldered to said respective flanges prior to seating said contacts in their respective slots in front of the surface on the end of said housing opposite the junction box.

RICHARD W. VERDON.

References Cited in the file of this patent

UNITED STATES PATENTS

| Number | Name | Date |
|---|---|---|
| 1,146,938 | Hubbell | July 20, 1915 |
| 1,205,683 | Thomas | Nov. 21, 1916 |
| 1,505,179 | Whiteley | Aug. 19, 1924 |
| 1,618,909 | Benjamin | Feb. 22, 1927 |
| 1,747,896 | Gates | Feb. 18, 1930 |
| 2,044,444 | Pond | June 16, 1936 |
| 2,184,359 | Mueller | Dec. 26, 1939 |
| 2,432,848 | Workman | Dec. 16, 1947 |